March 1, 1938.  L. SAIVES  2,109,710
DEVICE FOR THE CONTROL OF SLIDING BODY TOPS FOR VEHICLES
Filed June 10, 1936
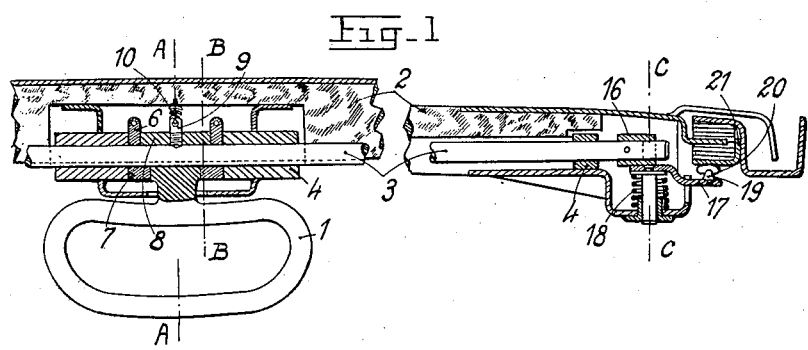
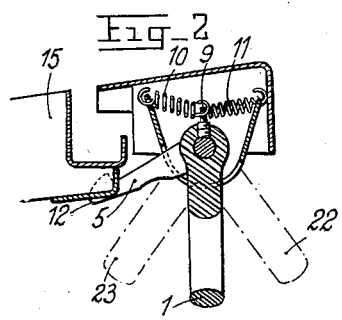
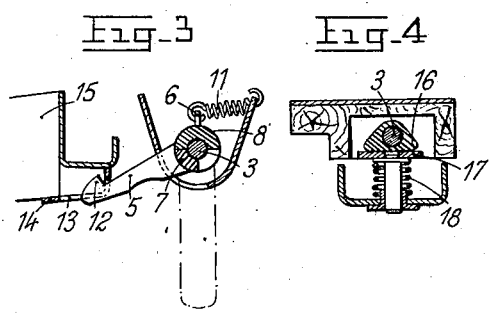
L. Saives
INVENTOR
By Glascock Downing & Seebold
Attys.

Patented Mar. 1, 1938

2,109,710

UNITED STATES PATENT OFFICE 2,109,710

DEVICE FOR THE CONTROL OF SLIDING BODY TOPS FOR VEHICLES

Leon Saives, Billancourt, France, assignor to Louis Renault, Billancourt, France Application June 10, 1936, Serial No. 84,569
In France November 20, 1935

2 Claims. (Cl. 292—8)

The present invention relates to a device for the control of sliding body tops for vehicles, in which the displacement of the body top is effected by means of an operating handle, while the locking parts, which secure the sliding top in its closed position or in its various open positions, are automatically released when the said operating handle is moved for the displacement of the body top in either direction.

In conformity to the invention, the operating handle is secured to a transverse shaft which is rotatable in bearings mounted on the sliding body top, and which acts, by its rotation, upon the locking devices. The said locking devices may comprise, for the closed position, a central pawl adapted to engage in a stationary part of the car body, and also for the various open positions, small lateral spring-mounted studs cooperating with the teeth of suitable racks which are mounted on the edges of the car body between which the movable top is slidable. The operating handle and the shaft to which it is secured may act upon said locking devices by any suitable means assuring the release of the central pawl when the said handle is drawn in the opening direction, and the release of the lateral spring-mounted studs when the said handle is moved in either direction.

The accompanying drawing shows an embodiment of the invention.

Fig. 1 is a cross section of the sliding roof, showing the operating handle and the shaft controlling the locking parts.

Fig. 2 is a section of the device in the line A—A of Fig. 1.

Fig. 3 is a section of the device on the line B—B of Fig. 1.

Fig. 4 is a section of the device on the line C—C of Fig. 1.

In the embodiment shown in the drawing, the operating handle 1, by which the sliding top 2 may be moved, is secured to a transverse shaft 3 which is rotatable in bearings 4 mounted on the sliding top and which acts upon the locking parts, as will be further set forth.

In the closed position, the locking of the said top is effected by a central pawl 5 which is provided with two lugs 6 engaged upon the shaft 3 on the respective sides of the said handle. Each of the said lugs is provided laterally with a projecting sector 7, with whose sides another sector 8 mounted on the said handle is adapted to make contact, as shown in Fig. 3. The said handle is secured to a central lug 9 to which is attached a spring 10, which is secured at the other end to the sliding top and serves to return the said handle to its mean position, when this latter is inclined to the left of Fig. 2. To the lugs 6 are attached springs 11 which are secured at the other end to the sliding top and serve to return the said handle to its mean position when it is inclined to the right of Fig. 2. The pawl 5 comprises a pointed end 12 adapted to engage in an aperture 13 in a member 14 mounted on the fixed part 15 of the roof. The sectors 7 and 8 have such position that the handle will effect the release of the pawl when the handle is inclined to the right of Fig. 2, and that inversely, the springs 11 attached to the pawl will urge the said handle into its mean position. On the contrary, the handle and the pawl will not act upon each other when the handle is inclined to the left of Fig. 2.

At each end, the shaft 3 is secured to a cam 16 (Fig. 4) which acts upon a member 17 urged by a compression spring 18 and carrying a stud 19 which—under the action of the spring 18—engages with the teeth of a rack 20 mounted on the fixed edge 21 of the car body.

The operation of the said device is as follows. When the sliding roof is in the closed position, the end 12 of the pawl 5 is engaged in the aperture 13 of the member 14, as shown in Fig. 3. In order to open the top, the operator acts upon the handle, drawing it to the right of Fig. 2 and thus bringing it into the position shown at 22, in which the sector 8 acts upon the sector 7, thus lowering the pawl 5 and releasing it from the fixed member 14. The sliding top can thus be drawn by the handle into the desired position of opening, and when the handle is released, it will return to its mean position by the action of the springs 11, and the cam 16, which was inclined at the same time as the handle, now returns to the position shown in Fig. 4, and thus, on each side of the top, the stud 19 is engaged with the teeth 20, thereby holding the top in the fixed position. Should it now be desired to close the sliding top, the said handle is moved in the opposite direction, inclining it into the position shown at 23, in which the sector 8 has no action upon the sector 7, and thus the pawl 5 will remain in the position which is given to it by the springs 11; the inclination of the handle causes the descent of the spring-mounted studs 19, which are thus released from the teeth 20. The top can thus move in the direction corresponding to the action exercised upon the handle. If the handle is pushed to the end, into the position of complete closing, the end 12 of the pawl 5 will engage with the interior of the member 14, thus locking the device in the position corresponding to the complete closing.

I claim:

1. A device for the control of a sliding body top for vehicles, comprising a transverse shaft rotatable in supports mounted on the sliding top, a handle secured to the said shaft, means for locking the said top in the closed position and adapted to be actuated by said shaft when the handle is drawn towards the opening position, a cam secured to each end of said shaft, a spring mounted stud vertically displaceable by said cam and adapted to engage a rack mounted on the fixed part of the vehicle body when the shaft is in its mean position, said cam being actuated by said shaft when the handle is drawn in either direction to release the stud from engagement with the rack.

2. A device for the control of a sliding body top for vehicles, comprising a transverse shaft rotatable in supports mounted on the sliding top, a handle secured to the said shaft, an attaching lug mounted on the fixed edge of the vehicle body, with which the edge of the body top makes contact in the closed position, an aperture formed in said attaching lug, a central pawl secured to the transverse shaft, springs urging said pawl into the closed position, means for actuating the said pawl in the opening direction by means of the shaft, when the said handle is drawn in the corresponding direction, means for locking the top in various positions of opening, and means actuated by the said shaft when the said handle is drawn in either direction to release said locking means.

LEON SAIVES.